Figure 3:
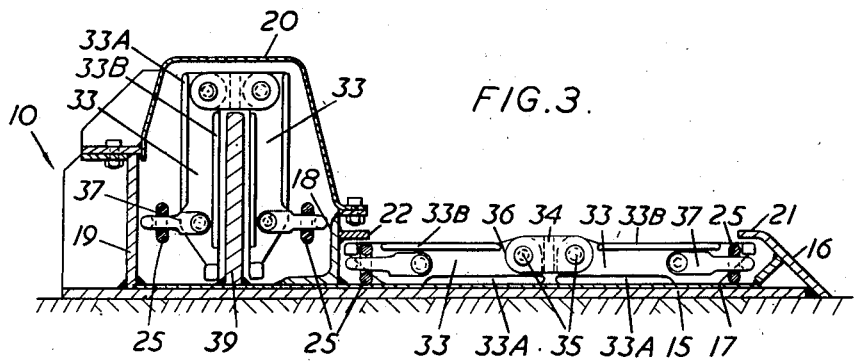

May 28, 1957 C. S. SANDEMAN ET AL 2,793,737
SCRAPER CONVEYORS
Filed Dec. 22, 1954 5 Sheets-Sheet 1
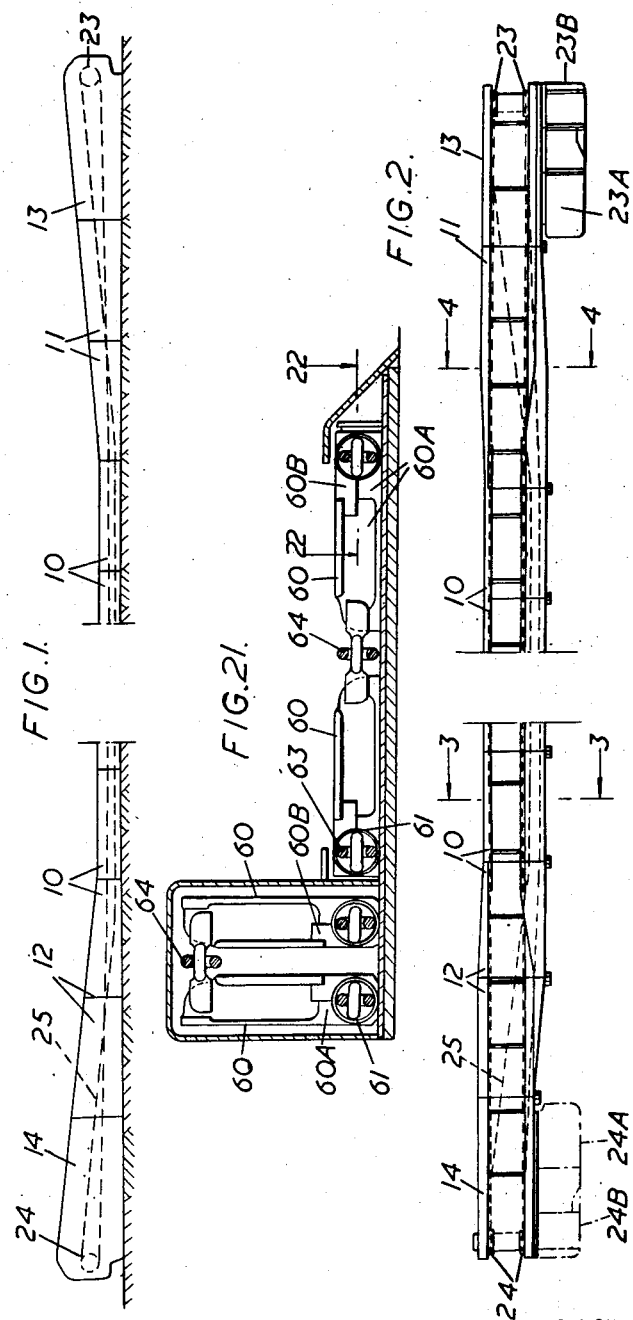
Inventors:
CARGILL SPEIRS SANDEMAN
ROBERT HENRY REED
By
Richardson, David and Nordon
Attorneys Inventors:
CARGILL SPEIRS SANDEMAN
ROBERT HENRY REED
By Richardson, David and Nordon
Attorneys

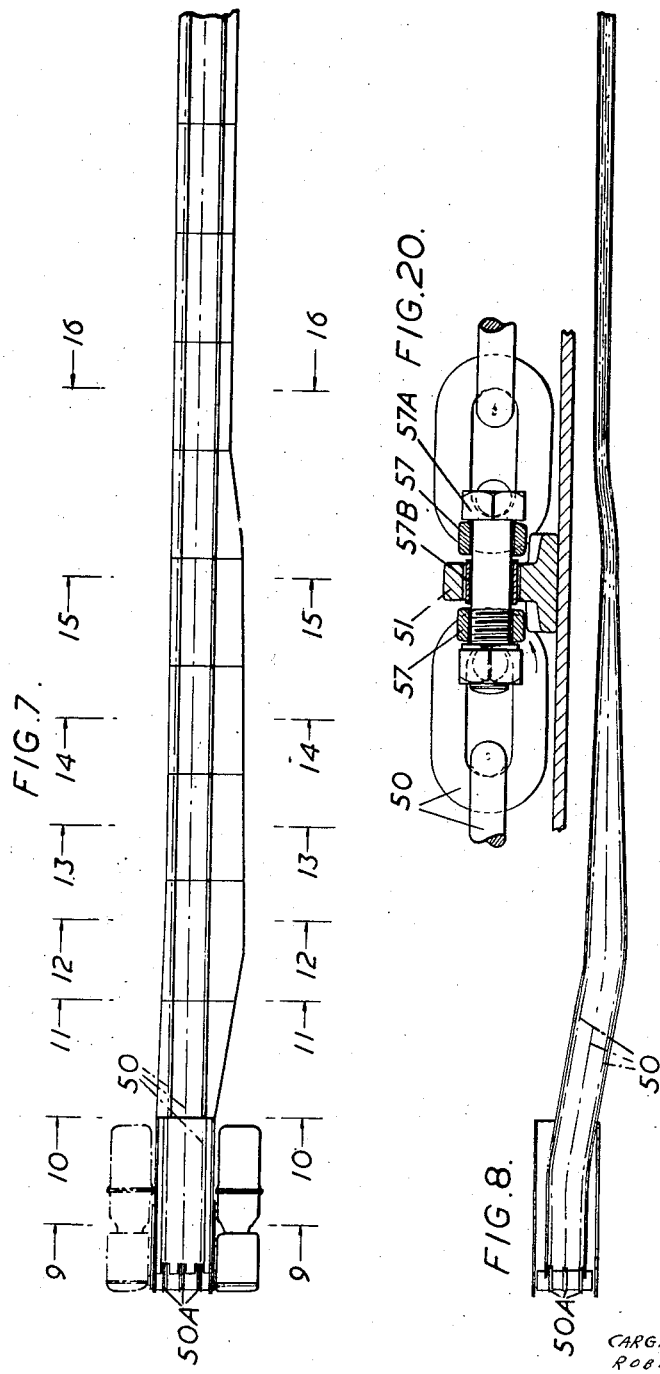

May 28, 1957  C. S. SANDEMAN ET AL  2,793,737
SCRAPER CONVEYORS
Filed Dec. 22, 1954  5 Sheets-Sheet 4
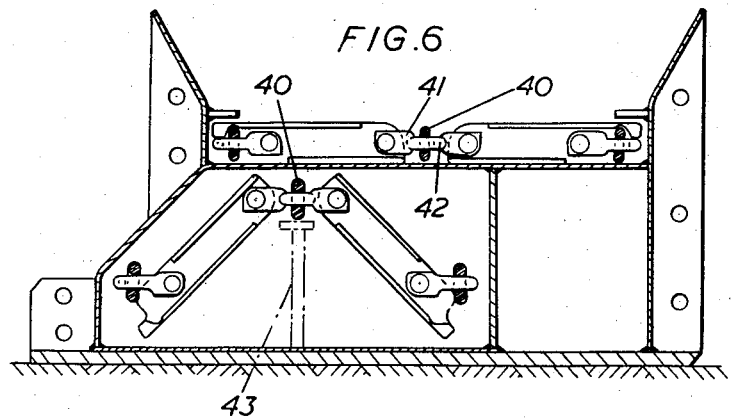
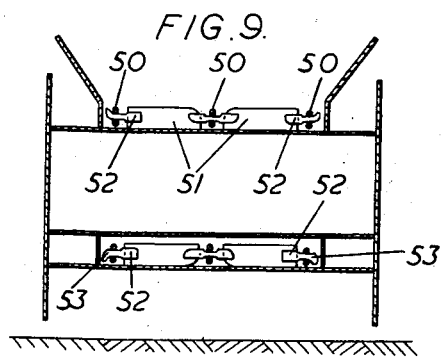
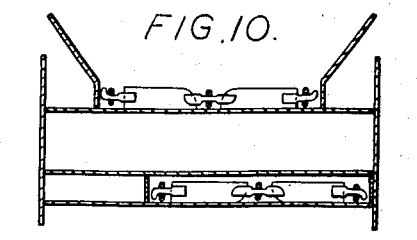
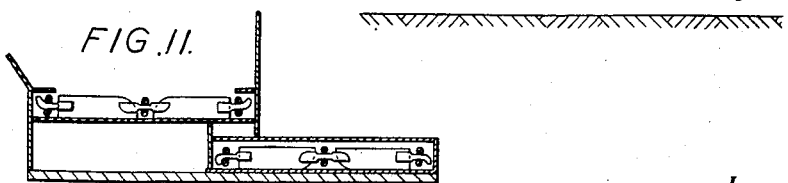
Inventors:
CARGILL SPEIRS SANDEMAN
ROBERT HENRY REED
By Richardson, David and Nardon
Attorneys.

May 28, 1957  C. S. SANDEMAN ET AL  2,793,737
SCRAPER CONVEYORS
Filed Dec. 22, 1954  5 Sheets-Sheet 5
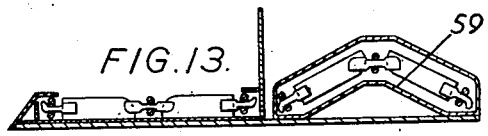
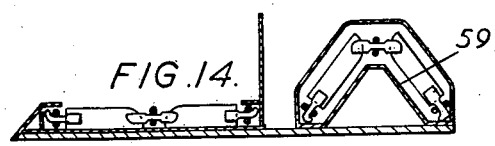
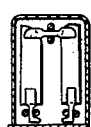
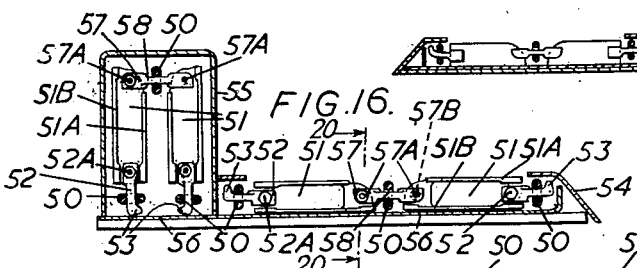
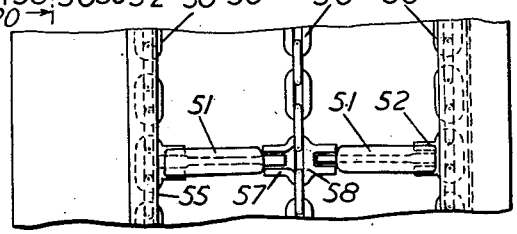
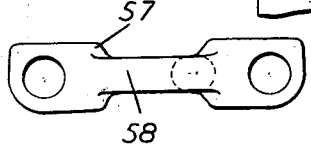
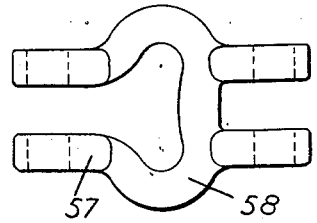
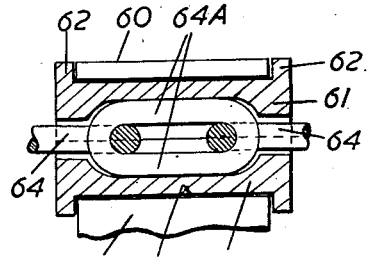
Inventors:
CARGILL SPEIRS SANDEMAN
ROBERT HENRY REED
By
Richardson, David and Nordon
Attorneys

United States Patent Office 2,793,737
Patented May 28, 1957

2,793,737

SCRAPER CONVEYORS

Cargill S. Sandeman and Robert H. Reed, Glasgow, Scotland, assignors to Mavor & Coulson Limited, Glasgow, Scotland Application December 22, 1954, Serial No. 476,924

6 Claims. (Cl. 198—170)

This invention relates to conveyors of the type including an endless series of inter-connected components, or "scrapers," which in their working run travel along a passage and entrain with them the coal or other mineral supplied to said passage for conveyance. Conveyors of this type, known as "scraper conveyors," are used for instance as so-called "face conveyors" in coal mines worked by the "longwall" system for the conveyance of coal stripped from the face of the seam.

In conveyors of the type stated, the conveyance passage and a return runway are provided by a stationary frame structure, composed of end-to-end sections, along which the components travel in their working and return runs.

It is desirable that a conveyor of the type stated, when designed for work as a face conveyor, shall work close to the mine floor in order that either the broken-down coal can be readily transferred laterally outwards from the face and mine floor to the conveyance passage (along which the scraper components travel) or the conveyor can be forced laterally inwards below the broken-down coal so as to load the coal upon the conveyance passage.

It is also desirable that a conveyor of the type stated, when designed for work as a face conveyor, shall be compact in width in order that propping of the otherwise unsupported mine roof can be extended to near the face.

Moreover, when such a conveyor has to be used in cooperation with a continuous mining machine, it is also desirable that the conveyor can be laterally advanced without dismantling, or "snaked" as it is called, in order that as the face is progressively cut away the conveyor can be brought section-after-section as close as practicable to the new face.

The object of the invention is to provide an improved conveyor of the type stated having the aforesaid desirable features.

The present invention is a series of inter-connected mineral-entraining components for a conveyor of the type stated, said components each comprising a pair of scrapers which are pivotally inter-connected so that in their working run they are extended to lie down in end-to-end alignment across the conveyance passage and so that in their return run they are folded together in a more or less parallel setting.

Preferably, the pivotal connection between each pair of scrapers is such that one direction of pivotal movement is limited to their aligned setting (namely, with the scrapers at or about 180°) and that in the other direction of pivotal movement the scrapers are free to pivot into their more or less parallel setting.

The pivotal connection may incorporate a connector having terminal bearings, in which event the scrapers also have terminal bearings at their proximal ends and pivot pins pass through the associated bearings of the connector and scrapers.

The present invention also is a conveyor of the type stated having an endless series of mineral-entraining components as above defined inter-connected by chain means which pass round sprockets at opposite ends of the stationary frame structure of the conveyor, there being a driving motor or two opposed driving motors at one end of said structure, or at each end thereof, to drive the associated sprocket or sprockets.

Preferably, the chain means comprise or include two endless chains arranged in the working runs at opposite sides of the conveyance passage and in the return run at opposite sides of the return runway, there being a pivotal shackle between the distal end of each scraper and the associated chain.

Preferably, a third endless chain is arranged mid-way of the conveyance passage and of the return runway, this chain being pivotally connected with a connector between each pair of scrapers and being provided additionally or alternatively to side chains.

The return runway may be fitted with an upright rail serving as a support for the pivotal connection between the scrapers, the arrangement being such that this rail holds the pivotal connection in a raised position and permits the scrapers to hang vertically in their parallel setting.

Figure 4:
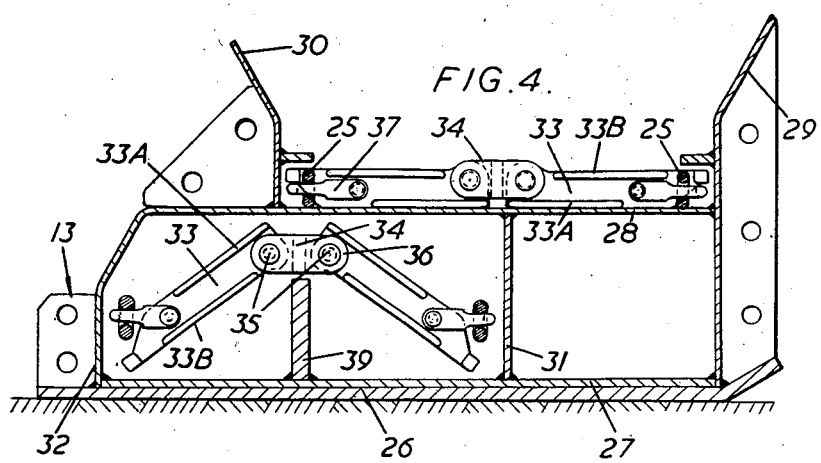

Examples of coal-mine conveyors according to the invention will now be described with reference to the accompanying drawings, in which:

Figs. 1 and 2 are diagrammatic views, namely an elevation and a plan respectively, of portions of the frame structure of a conveyor according to a first example, in which there are two side chains. Figs. 3 and 4 respectively are sections on the lines 3—3 and 4—4 of Fig. 2.

Figure 5:
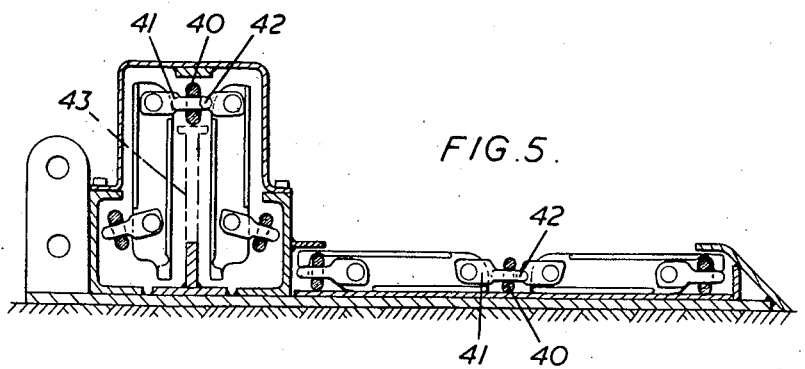

Figs. 5 and 6 are views corresponding to Figs. 3 and 4 but illustrating a second example, in which there is also a third chain.

Fig. 7 is a plan of one end of the frame structure of a conveyor according to a third example. Fig. 8 is a corresponding plan illustrating the return run. Figs. 9 to 16 are sections on the lines 9—9 to 16—16 respectively of Fig. 7, Fig. 16 being drawn to a larger scale. Fig. 17 is a part plan corresponding to Fig. 16. Figs. 18 and 19 are views of a connector. Fig. 20 illustrates a detail, being a section on line 20—20 of Fig. 16.

Fig. 21 is a view corresponding to Fig. 3 illustrating a fourth example, and Fig. 22 is a section on the line 22—22 of Fig. 21, being drawn to a larger scale.

In the first example according to Figs. 1 to 4, the stationary frame structure is composed of end-to-end sections, those of normal construction being indicated by 10 in Figs. 1 and 2, the end sections being indicated by 11 and 12, and the sections merging from the normal sections 10 into the sections 11 and 12 at opposite ends being indicated by 13 and 14. In Figs. 1 and 2, the main central length of the conveyor is broken away, only a few of the normal sections 10 being shown. It will be apparent that the sections 10 are all similar, being interchangeable.

With reference more especially to Fig. 3, each normal section of the frame structure comprising a base including a number of spaced cross strap plates 15 which at the side coming adjacent to the coal face are secured to a sloping kerb plate 16 serving as a ramp up and over which broken-down coal may easily move. The base also includes a floor plate 17, which is supported by the strap plates 15 and which forms the floor of the conveyance passage and of the return runway. At the side of the floor plate 17 further from the coal face there is formed a housing, which consists of upright walls 18 and 19 roofed by a removable cover 20. The kerb plate 16 and the inner wall 18 of the housing have inwardly directed horizontal flanges 21 and 22 which extend along the margins of the conveyance passage and serve as retainers for the mineral-entraining components, hereinafter described, The sections at opposite ends of the structure are formed to accommodate pairs of sprockets 23, 23 and 24, 24 (see Figs. 1 and 2) by which chains 25 interconnecting the mineral-entraining components are guided and driven. Moreover, the sections 11, 12, 13 and 14 are so constructed that the mineral-entraining components pass at one end from the working run to the return run and at the other end from the return run to the working run. The construction is such that the components are inverted in their passage from each run to the other.

The end section 13 has attached to it an electric motor 23A and a gearcase 23B, through speed-reduction gearing in which the motor drives the sprockets 23. A similar motor 24A and gearcase 24B may be attached to the opposite end section 14 to drive the associated sprockets 24; or, if desired, one end section may have two motors, with gearcases, at opposite sides (as Fig. 7 shows); or there may be two such opposed motors at each end so that there are four motors in all.

Referring especially to Fig. 4, this shows a conveyor section 13, which is of a construction such that the mineral-entraining components are prepared for inversion in their passage from one run to the other. As shown, the section is somewhat narrower and appreciably higher than a normal section 10. The section 13 has spaced strap plates 26 supporting a floor plate 27 and in addition has a deck plate 28 at a raised level. This deck plate 28 serves as an upwardly inclining continuation of the floor of the working runway whereas the floor plate 27 serves as the floor of the return runway. The working runway is flanked by side walls 29 and 30. Lower level walls 31 and 32 serve to enclose the return runway. It will be apparent that the upwardly inclining deck plate 28 has a continuation in the associated end section 13 leading to the level of the top of the associated sprockets 23 and that a corresponding arrangement is provided in the sections 12 and 14 at the opposite end of the conveyor leading to the sprockets 24.

Each mineral-entraining component consists of two scrapers 33 connected together at their proximal ends by a connector 34. The connecting means include two journal pins 35, each passing through terminal bearings in the connector 34 and the associated scraper 33. The bearings of the connector are formed in terminal forks 36, and each scraper end fits between the tines of one of these forks. The scrapers are strengthened by ribs 33A and 33B. The ribs 33A extend inwards sufficiently to engage with the connector 34 when the scrapers occupy an aligned setting in their working run (Figs. 3 and 4), the arrangement being such that the scrapers are then locked against upward pivotal movement relatively to the chains 25. Thus, when the scrapers travel along their working run, each pair functions like a rigid unit, which cannot be forced to pivot upwards, for instance by lumps of coal tending to squeeze below the connectors 34. Moreover, the flanges 21, 22 serve as retainers overlying both side chains 25 in the conveyance passage and preventing the components 33, 33, as a whole from being forced to rise from the floor plate 17. In this way, the connectors 34 and the flanges 21, 22 co-operate to prevent the scrapers 33 being forcibly lifted from the floor plate in the work of conveyance.

However, the ribs 33B stop short of the connector 34 so that, when the scrapers are inverted as they pass into the return run, they are free to pivot and fold downwards (Fig. 4); thus, each scraper hangs parallel to the other when the normal sections 10 are reached (Fig. 3).

At the distal ends of both scrapers they are fitted with pivotal shackles 37.

The mineral-entraining components of the conveyor are inter-connected to form an endless series by lengths of the chain 25 at opposite sides, each length extending from shackle 37 to shackle 37 of neighbouring components. Thus, the shackles in effect form links of two endless side chains.

In the example, throughout the length of the return runway, the floor plate has secured to it a mid-rail 39 which is of full height throughout the normal sections 10 (Fig. 3) but which is tapered so as to decline at the end sections 11 to 14 (Fig. 4). The arrangement is such that the connectors 34, during their passage in succession from the working run to the return run are engaged by the rail 39 and raised to their return height, the scrapers 33 with the attached chains 25 being thus caused to pivot gradually downwards to the parallel position adopted in the return run. However, such a mid-rail may be omitted; or a gable-section ramp may be used (such as indicated by 59 in Figs. 13 and 14).

In the passage of the connectors 34 from the return run to the working run, they gradually move downwards to the level of the floor plate 17, the chains 38 then spreading apart to full width and the scrapers 33 being extended to lie down in end-to-end alignment across the floor plate in the conveyance passage. Seeing that, at each end of the conveyor, one of the pair of sprockets is nearer than the other to the return run of its chain through the normal sections 10, any appropriate compensating provision is made to deflect the chain of the nearer sprocket through a lengthened path having the same length as the path of the other chain.

Seeing that the floor plate 17 can be disposed practically at mine-floor level, as Fig. 3 shows, the work of supplying the broken-down coal to the conveyor is facilitated. Moreover, the setting of the scrapers in the return runway is such that the housing 18, 19, 20 can be narrow in width in comparison with the conveyance passage, so much so that the housing does not add seriously to the overall width of the conveyor frame structure. Nevertheless, the housing can be high enough to act as a wall serving to retain the broken-down coal within the conveyance passage.

It will be clear from Fig. 2 that in each stretch of the chains 25 between each of the sprockets 23 and 24 and the laterally offset return runway that the chains deflect sidewise. Such deflection is permitted because the chains are of the simple loop-link type (see Figs. 3 and 4 and also Fig. 17 showing a chain 50 of this type).

In the example according to Figs. 5 and 6 there is provided a third endless chain 40, this chain being arranged midway of the width of the working and return runs. In this example the connectors 41 between the scrapers forming the mineral-entraining components are each formed with a ring 42 simulating a chain link (see also Figs. 18 and 19) and lengths of the chain 40 inter-connect the rings of neighbouring components.

The arrangement may be such that a mid-rail 43 may again be provided, but to engage the mid-chain 40, which in this event will ride along the top of the rail (Fig. 5).

In other respects this example may be similar to the example according to Figs. 1 to 4. Notably, the arrangement is such that the scrapers are ribbed to prevent them pivoting upwards relatively to the side chains in the working run; that is to say, the middle chain 40 is held down, as Figs. 5 and 6 show.

In the example according to Figs. 7 to 20, there are also three chains 50, these being trained round three sprockets 50A at each end section. At the distal ends of each two pivotally inter-connected scrapers 51, both scrapers have shackles 52 which each include a bolt 52A and which are engaged by the lengths of chain inter-connecting neighbouring mineral-entraining components. Each shackle has a bulbous end 53, which in the working run is guided by the adjacent side 54 or 55 of the conveyance passages and which in the return runway slides upon the floor plate 56.

A connector 57 secured to the proximal ends of each two scrapers by bolts 57A is formed with a loop 58 (Figs. 16, 18 and 19) to simulate a chain link and to interconnect the consecutive lengths of the middle chain 50. Each bolt 57A has a sleeve 57B (see Fig. 20) which fits through the scraper 51 and serves as a distance piece between the forked ends of the connector 57.

In this example, a gable-section plate 59 is provided in the return runway in the sections illustrated by Figs. 13 and 14, these sections providing for transition between the aligned lying-down condition (Figs. 9, 10, 11 and 12) in which the scrapers return to or from the terminal sprockets 50A and the folded condition (Fig. 16) adopted in the normal sections. This plate 59 serves (like the rail 39 of Figs. 3 and 4) to facilitate the pivotal action of the scraper 51 in relation to their connectors 57.

In this pivotal action, the side chains 50 are twisted by the shackles 52 through an angle of about ninety degrees, as will be apparent by comparing these side chains (Fig. 16) inside the return housing 55 with the middle chain above, which is maintained untwisted by the connectors 57. This twisting effect is permitted by the loop-link type of chains which are used.

Fig. 16 shows best how each scraper 51 has upper and lower ribs 51A and 51B. These ribs extend outwards to the distal ends, so that the main body of the shackle 52 comes between them. Thus, the shackle is a rigidly projecting fixture. Moreover, as in the example according to Figs. 5 and 6, the ribs 51A and 51B engage below the connectors 57 (see also Fig. 20) in the working run and so prevent the connectors and the middle chain from being forced upwards from the floor plate 52. That is to say, the pivotal connection between the scrapers is such that in one direction the scrapers are free to pivot to hang down more or less parallel and in the other direction the pivotal movement is limited to their aligned setting (namely, with the scrapers at about 180° to one another). Moreover, as already explained with reference to Figs. 1 to 4, flanges 21 and 22 on the side kerb 54 and the housing side wall 55, respectively, of the conveyance passage serve as retainers to prevent the side chains 50 and the components 51, 51, at their distal ends, rising from the floor plate 56.

In the example according to Figs. 21 and 22 at the distal ends of each two pivotally inter-connected scrapers 60, both scrapers have swivel blocks 61, the axes of which are in the direction of the conveyor's length. Each block is made in diametrally jointed halves, and it is formed as a journal having retaining flanges 62 at opposite ends. The journal is freely turnable in a bearing hole 63 provided for it in the scraper, which also is made in jointed parts, namely a main body 60A and an end fitting 60B. These parts 60A, 60B are divided in a horizontal transverse plane, namely the plane 22—22, Fig. 21 to provide for insertion of the associated block 61. Each block is made to engage the longitudinal portions 64A of a link in one of two endless side chains 64, by which the mineral-entraining components are interconnected and driven.

We claim:

1. A conveyor comprising a frame structure including a floor plate with a kerb along one side and a housing along the opposite side, said kerb and housing forming the walls of a conveyance passage and said housing enclosing a return runway, an endless series of mineral-entraining components each comprising a pair of scrapers with a pivotal connector between their proximal ends, endless side chains to which said components are linked at the distal ends of the scrapers, sprockets at opposite ends of the frame structure and engaging said chains so as to guide said chains and components from the conveyance passage to the return run, and vice versa, and so as to invert said components for the return run, retainers arranged along said kerb and said housing so as to overlie both of said chains in the conveyance passage in order to prevent rising of said components at their distal ends from the floor plate, and interengaging means on the scrapers and connectors designed to prevent said scrapers from rising at their proximal ends from the floor plate but to permit the scrapers to fold down pivotally when said components are inverted for the return run.

2. A conveyor according to claim 1 in which the frame structure also includes means on the floor plate for engaging the inter-scraper connectors in their movement from the sprockets to the return run and serving to raise said connectors and cause the scrapers to fold downwards.

3. A conveyor according to claim 1 in which the endless side chains are of the loop-link type capable of flexing sidewise and twisting and in which the linking between the distal ends of the mineral-entraining components and the endless side chains twists these chains through about ninety degrees when the scrapers fold down.

4. A conveyor comprising a frame structure including a floor plate with a kerb along one side and a housing along the opposite side, said kerb and housing forming the walls of a conveyance passage and said housing enclosing a return runway, an endless series of mineral-entraining components each comprising a pair of scrapers and a pivotal connector between the proximal ends of said scrapers, two endless side chains to both of which each component is linked at the distal ends of its scrapers, an endless middle chain inter-linking the pivotal connectors of said endless series, sprockets at opposite ends of the frame structure and engaging all of said chains so as to guide said chains and said components from the conveyance passage to the return run, and vice versa, and so as to invert said components for the return run, retainers arranged along said kerb and said housing so as to overlie both of said chains in the conveyance passage in order to prevent rising of said side chains and said components at their distal ends from the floor plate, and inter-engaging means on the scrapers and connectors designed to prevent said scrapers at their proximal ends and said middle chain from rising from the floor plate but to permit the scrapers to fold down pivotally when said components are inverted for the return run.

5. A conveyor according to claim 4 in which the frame structure also includes means on the floor plate for engaging the inter-scraper connectors in their movement from the sprockets to the return run and serving to raise said connectors and middle chain and cause the scrapers to fold downwards.

6. A conveyor according to claim 4 in which all three of the endless chains are of the loop-link type capable of flexing sidewise and twisting and in which the linking between the distal ends of the mineral-entraining components and the endless side chains twists these chains through about ninety degrees when the scrapers fold down, the middle chain being maintained untwisted by the pivotal connectors.

References Cited in the file of this patent

UNITED STATES PATENTS 2,381,519    Russell _____ Aug. 7, 1945

FOREIGN PATENTS 893,629    Germany _____ Oct. 19, 1953